(12) United States Patent
Mata

(10) Patent No.: US 11,582,926 B2
(45) Date of Patent: Feb. 21, 2023

(54) HYDROPONIC PLANT CULTIVATION SYSTEM WITH ELEVATED DRIP DELIVERY MANIFOLD

(71) Applicant: Caleb Mata, Corvallis, OR (US)

(72) Inventor: Caleb Mata, Corvallis, OR (US)

( * ) Notice: Subject to any disclaimer, the term of this patent is extended or adjusted under 35 U.S.C. 154(b) by 365 days.

(21) Appl. No.: 16/160,848

(22) Filed: Oct. 15, 2018

(65) Prior Publication Data
US 2020/0163295 A1   May 28, 2020

(51) Int. Cl.
*A01G 31/02* (2006.01)
*A01G 31/00* (2018.01)

(52) U.S. Cl.
CPC ........ *A01G 31/02* (2013.01); *A01G 2031/006* (2013.01)

(58) Field of Classification Search
CPC ........ A01G 31/00; A01G 31/02; A01G 31/06; A01G 2031/006
USPC ............................................................. 47/60
See application file for complete search history.

(56) References Cited

U.S. PATENT DOCUMENTS

| | | | | |
|---|---|---|---|---|
| 4,995,192 A * | 2/1991 | DeWid | ............... | A01G 13/0237 47/20.1 |
| 5,117,581 A * | 6/1992 | Green | .................... | A01G 27/04 47/18 |
| 6,293,048 B1 * | 9/2001 | Boulter | .................. | A01G 31/02 47/62 E |
| 8,667,734 B2 * | 3/2014 | Johnson | .................. | A01G 31/02 47/62 N |
| 8,726,568 B2 * | 5/2014 | Wilson | ................... | A01G 31/00 47/62 R |
| 8,904,705 B2 * | 12/2014 | Downs, Sr. | ............ | A01G 31/02 47/62 A |
| 9,814,188 B2 * | 11/2017 | Almudhyan | ........... | A01G 13/10 |
| 2018/0368346 A1 * | 12/2018 | Watson | .................. | A01G 29/00 |

* cited by examiner

*Primary Examiner* — Brady W Frazier
(74) *Attorney, Agent, or Firm* — Chernoff, Vilhauer, McClung & Stenzel, LLP

(57) ABSTRACT

A scalable, hydroponic plant cultivation system that incorporates top-down drip technology, a root misting spray, and a closed loop, lotic nutrient-rich, water-based solution circulation system in a highly oxygenated environment using aeration technology. The hydroponic system starts with a reservoir that is connected at its base to a series of plant containers which is in a closed loop system that pumps nutrient rich solution out from the reservoir to each plant container via an elevated, acequia drip system that provides the nutrient rich solution to the base of the plants, which is then circulated passively down through the root basket and then through the entire system of networked containers and back to the main reservoir. The next element of the hydroponic system has the reservoir connected to a series of pipes and manifolds that run through the upper interior of each plant container to deliver an aerated spray directed at the plant's upper roots. The next element of the hydroponic system is an aeration system that delivers oxygen directly into the nutrient rich water in each container. The final unique aspect of the system is the lightproof cover that covers the top of the root basket and wraps around the base of the stock of the plant to prevent algae growth. The aforementioned elements of the hydroponic system combine to create the optimum environment for what plants need for rapid and vigorous plant growth.

5 Claims, 7 Drawing Sheets

HYDROPONIC PLANT CULTIVATION SYSTEM WITH ELEVATED DRIP DELIVERY MANIFOLD

CROSS REFERENCES TO RELATED APPLICATIONS

This application claims the benefit of U.S. Provisional Patent Application Ser. No. 62/572,952 filed on Oct. 16, 2017 entitled "Hydroponic Plant Cultivation System", the disclosure of which is hereby incorporated by reference.

FIELD OF THE INVENTION

The present invention relates generally to a hydroponic plant cultivation system and methods that include continuous drip, mist, aeration, and lotic flow technology to maximize plant yields.

SUMMARY

In one embodiment of the present invention, a series of plant containers are interconnected and then connected back to a main reservoir in a lighttight, closed-loop, lotic system that provides for continuous circulation of the water-nutrient solution to the plants' roots.

In one embodiment of the present invention, a gravity fed, acequia drip system that pumps a nutrient solution up from a reservoir to an elevation above the plant containers and then using the effects of gravity to deliver that nutrient solution via a series of tubes and regulation valves to the top of each root ball in the root baskets.

In one embodiment of the present invention, a manifold of sprayers inside each plant container delivering a 360-degree aerated mist of nutrient solution around each root basket to each plant's roots.

In one embodiment of the present invention, a hard plastic and neoprene foam cover snaps on to each basket housing the root ball to cover up the roots and growing medium inside the root basket to create a lightproof environment which prevents insect and algae growth in the roots of the plant.

In one embodiment of the present invention, an oxygenation system provides oxygen to the water-nutrient solution at the bottom of each plant container via an air pump, manifold and series of tubes and air stones.

DETAILED DESCRIPTION

The following discussion of the embodiments of the invention for the hydroponic system is only exemplary by nature and is in no way intended to limit the invention or its applications or uses.

Figure 1:
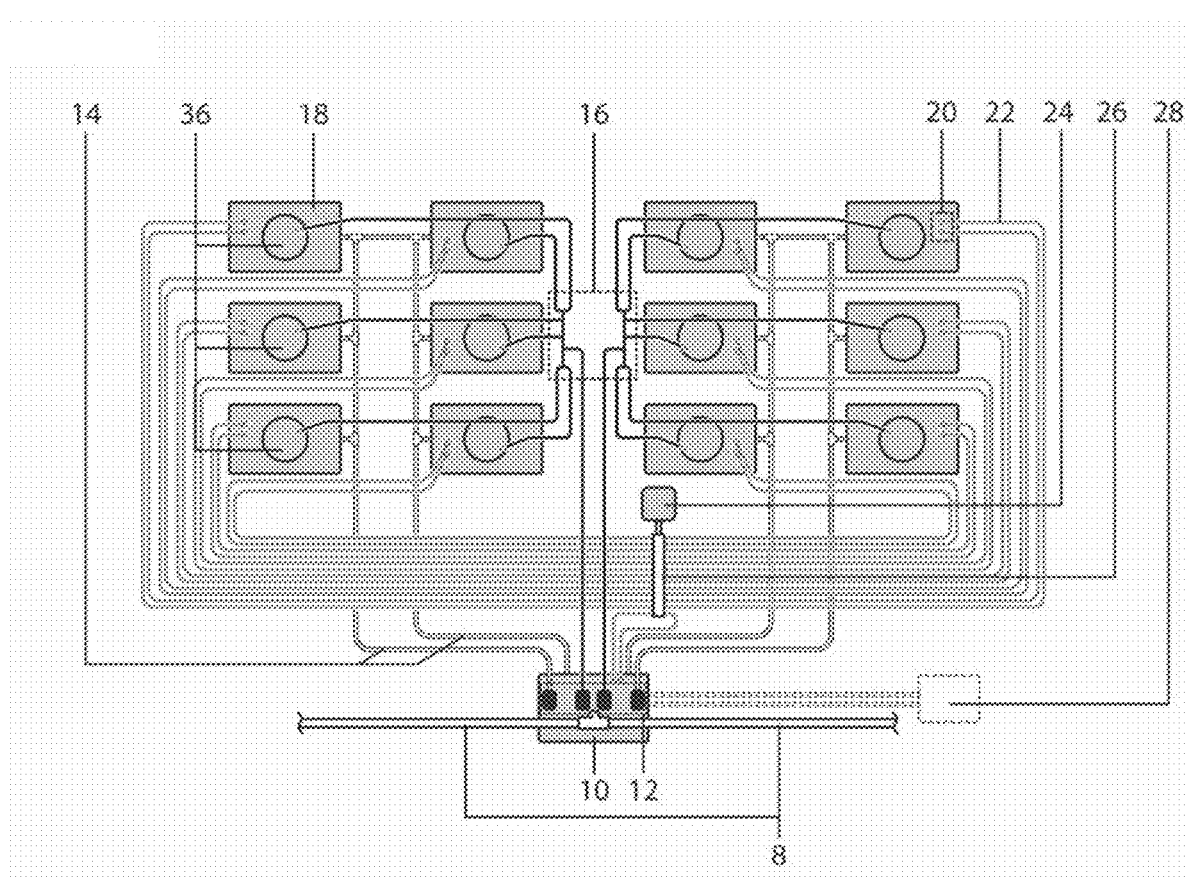
FIG. 1. This figure is a schematic block diagram of the complete hydroponic system and the key elements that comprise it, in accordance with some embodiments.

FIG. 1 is a schematic block diagram of a hydroponic system that includes a main reservoir 10, water pumps 12 and a series of pipes and tubes that feed a drip system and spray manifold system linked to one or more plant containers 18. Each plant container 18 is connected at its base to the other plant containers 18 and connected back to the reservoir 10 by a first series of connection tubing 14. For each of the drip irrigation systems and root sprayer systems, there are internal mesh filters that filter out any debris that could clog up the drip irrigation and root sprayer systems. A water chiller 28 can be added to the reservoir 10 container to provide for a more consistent temperature of the water-nutrient solution to keep the solution at the optimum temperature of between 65 and 75 degrees. In addition, the hydroponic system includes an air pump 24 that utilizes an air manifold 26 to deliver air to the water-nutrient solution inside the base of each plant container. From the air manifold 26, a second series of connection tubing 22 deliver air to the base of each plant container, below the water-nutrient solution level inside, which connect to an aeration stone 20. This stone disperses the concentrated air via bubbles into the water-nutrient solution, which absorbs the oxygen and provides a highly oxygenated solution to the plant's roots which promotes more rapid and vigorous plant growth. The pH and nutrient levels in the water-nutrient solution can be adjusted by testing the reservoir 10 container and adding the necessary ingredients to the reservoir 10 which will then disperse the solution to the rest of the plant containers 18 via the drip irrigation and root sprayer systems.

Figure 2:
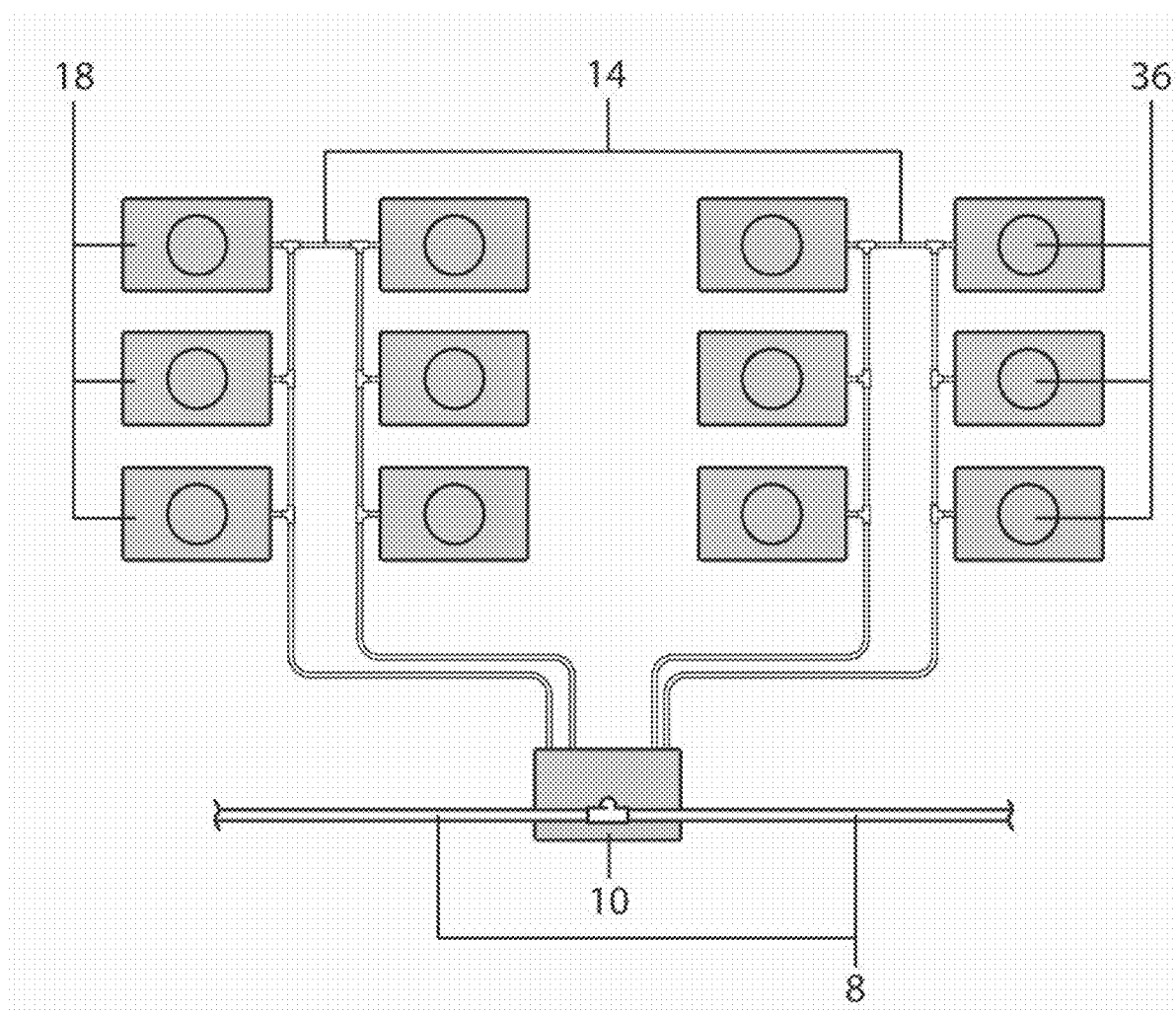
FIG. 2. This Figure shows an aerial view of the lotic system, consisting of reservoir and plant container connectivity, in accordance with some embodiments.
Figure 3:
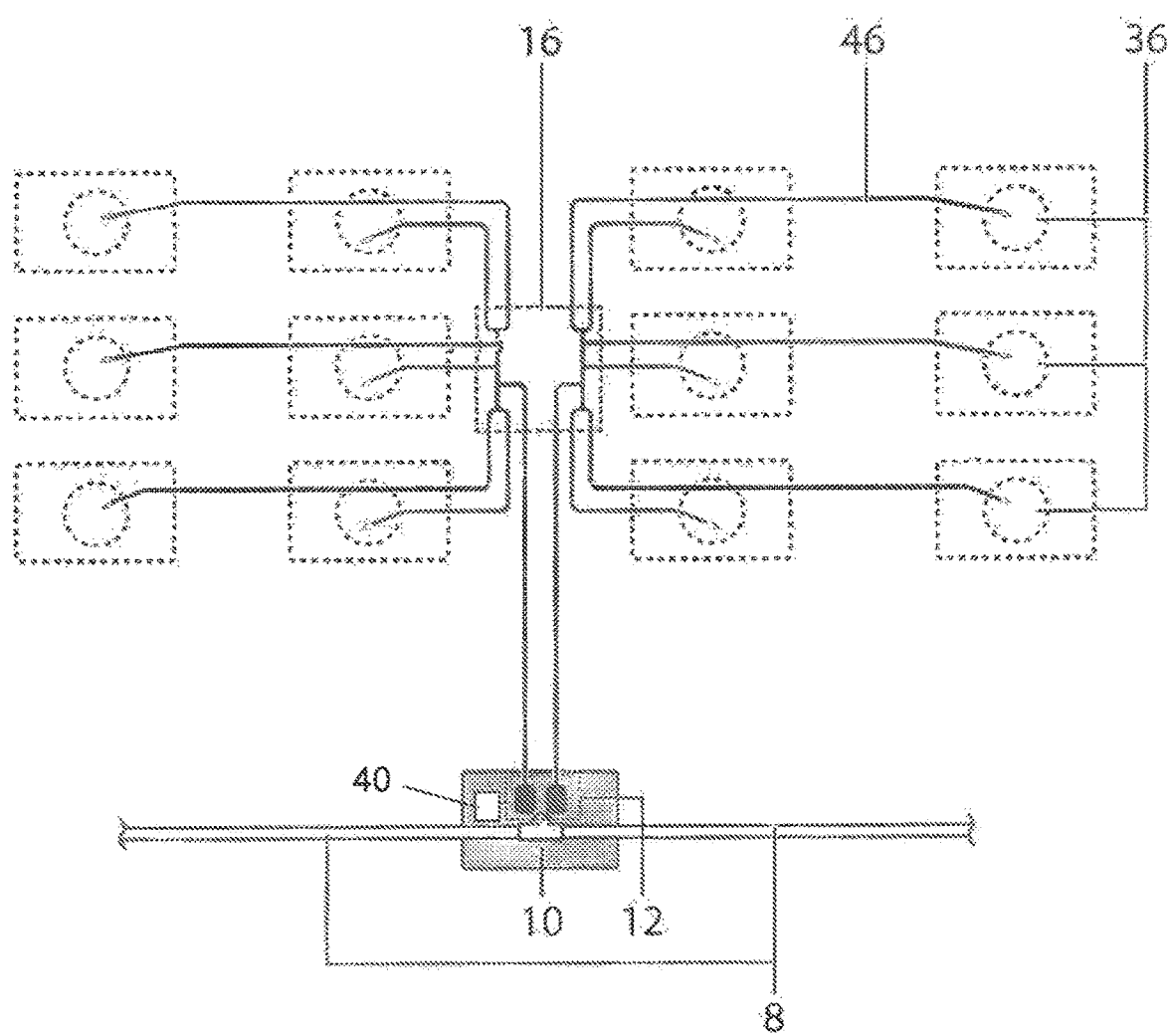
FIG. 3. This figure shows an aerial view of the drip irrigation system, in accordance with some embodiments.

FIG. 2 shows an aerial view of how the reservoir 10 connects to the system of connected plant containers 18 via the first series of tubing 14, which is then connected to another integrated reservoir and plant container system via a plastic pipe 8. A water regulating float valve (element 40 as shown in FIG. 3) inside the reservoir regulates the water level when water-nutrients are delivered from the plastic reservoir connection pipe 8. This connected system of reservoir 10 and plant containers 18 provides a method for receiving the water-nutrient solution from both the drip irrigation and root misting sprayer systems, which provide the methods for delivering the water-nutrient solution to each plant container, and allowing the water-nutrient solution to passively flow between each of the connected plant containers 18 and eventually back to the reservoir 10 where the water-nutrient solution is pumped back out of the reservoir 10 via aforementioned drip irrigation and root sprayer systems. This creates a complete closed loop system that pumps and then recycles the water-nutrient solution through the entire system. The connected plant containers 18 allow for easy flow of the water-nutrient solution between each of the plant containers 18. The series of connected plant containers 18 begins at the base of the reservoir 10 container, a lightproof tube 14 then extends out from the reservoir 10 container to a fitting on the bottom of the first plant container, and then connected to the next container via tubing 14. This can continue to through a series of containers and can be configured in several different patterns depending on the number of plant containers 18 desired. The system includes tubing 14 that connects between the outgoing and ingoing tubing lines. These tubes would provide for the water-nutrients to flow in multiple directions as it makes its way back to the main reservoir 10 container. The act of pumping the water out of the main reservoir 10, into the drip and root misting spray systems in each plant container generates water pressure that builds up in each plant container. The water pressure generated from the acequia drip system FIG. 3 produces lotic waters between the plant containers 18 and back to the pumps in the main reservoir 10 container with an outflow from the drip and root misting sprayer systems and the inflow back to the reservoir via the connected tubes at the bottom of the plant containers 18. The plant container system is easily scalable. Multiple configurations of containers can be setup depending on desired size of the hydroponic system. FIG. 2 also shows an upper opening 17 in the plant containers 18 where a root basket 36 and cover 48 are placed.

FIG. 3 shows an aerial view of the acequia drip system and how the reservoir 10 container connects to the raised drip irrigation system. The drip irrigation system in the current invention works by applying water directly to the base of the plant stalk to top feed each plant's roots. The high efficiency of drip irrigation maximizes water flow to the root ball within the baskets so that the water is only applied where it is needed, at the plant's roots. The reason for the drip irrigation is that it saves water, increases nutrient efficiency and grows healthier plants. A pump 12 inside the reservoir 10 container pumps the water-nutrient solution out of the reservoir 10 through a third series of either flexible or semi-rigid tubing 46 and up to a drip manifold 16 that is raised above the level of the top of the plant containers 18 using an elevated raised platform ("ERP") 54. By having the manifold raised to a point above the plant containers 18, the water-nutrient solution is able to flow down the third series of tubing to each plant container via an acequia, i.e., gravity-driven waterway system. Increased elevation can add water pressure to the water delivery system. The elevation changes can affect how well the system works. Each foot of elevation change is equal to 0.433 PSI of water pressure. By raising the manifold to a height above the emitters, it can vary based on desired pressure, but generally one to two feet above the emitters, you are gaining pressure in the drip system and delivering a stronger more consistent stream of water-nutrient solution to the plant base. A series of flexible tubes 46 branch off of the manifold providing an individual tube to the top of each plant's root ball within the root basket 36 and through the neoprene plug 50. At the end of each tube is a regulation valve 40 that delivers a continuous drip of water-nutrient solution to the plant's stock allowing the water-nutrient solution to continuously drip over the plant's roots and into the base of the plant container where is it recycled back to the reservoir 10 container.

Figure 4:
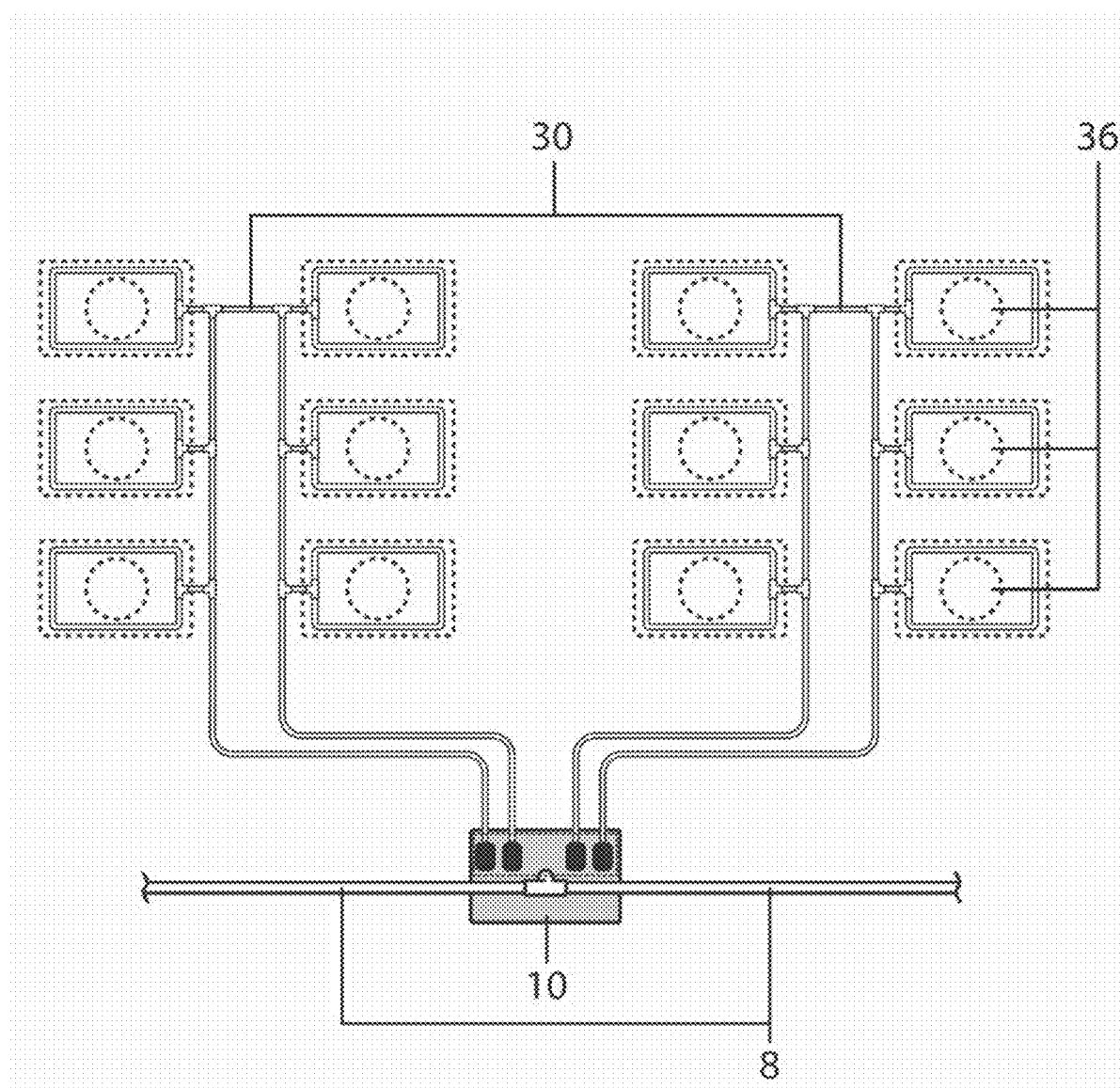
FIG. 4. This figure shows an aerial view of the root spray misting system, in accordance with some embodiments.

FIG. 4 shows an aerial view of the root sprayer system. The water-nutrient solution flows via a pump in the reservoir 10 container which creates the necessary pressure for pushing the water-nutrient solution through the sprayers in the manifolds generating water particles so small they create a spray or a mist depending on the pressure in the system. Attached to the pump is a timer. The timer determines both the duration of the misting as well as the frequency. There is a prefilter in the system to prevent particles from entering the misting sprayer system. The pump delivers the water-nutrient solution through a fourth series of connection tubing 30 into the inside of each plant container where it is connected to a square sprayer manifold that can be made of hard plastic, such as PVC. The sprayer manifold will be described in further detail below. On the opposite side of the sprayer manifold from where the fourth series of flexible tubing 30 entered the plant container, another tube extends out from the sprayer manifold and exits the plant container then subsequently enters the next plant container into that plant container's sprayer manifold. This system is very scalable and can be repeated for a series of connected plant containers 18 depending on the desired size of the system and the power of the pump to provide enough pressure to each sprayer manifold to produce a spray that can make contact with the root ball of each plant.

Figure 5:
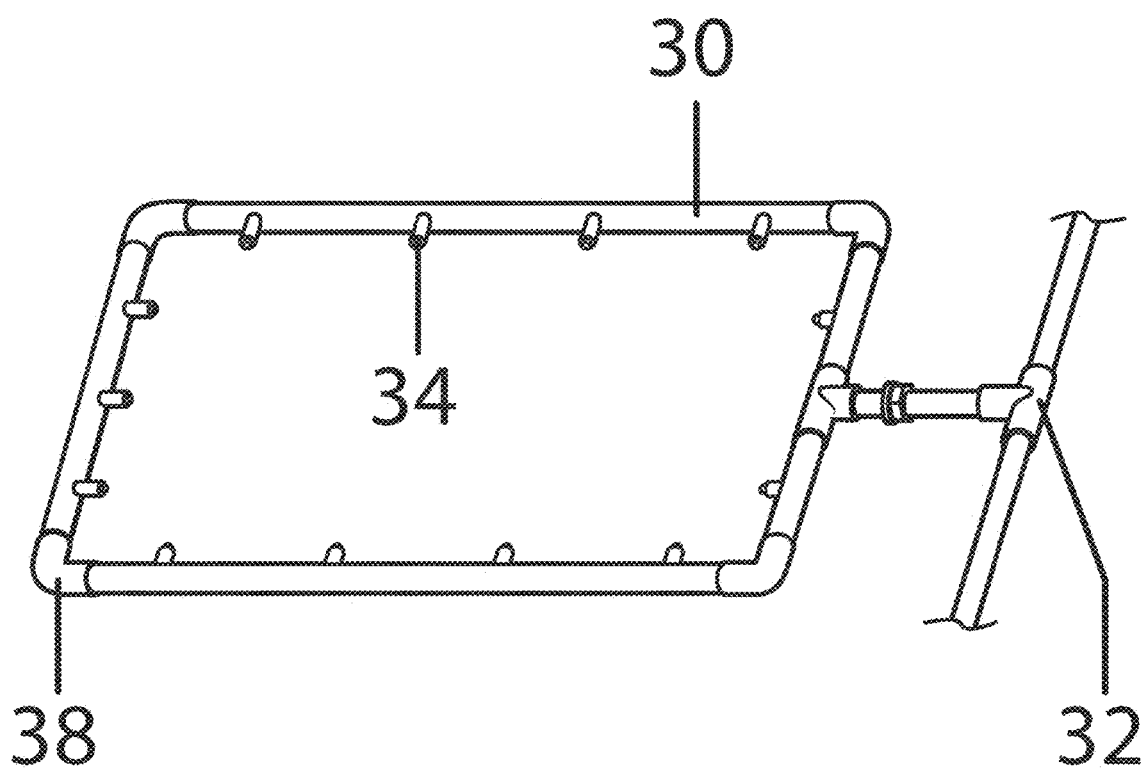
FIG. 5. This figure shows an individual root sprayer manifold that is inside each plant container, in accordance with some embodiments.

FIG. 5 shows an aerial blowup of a single sprayer manifold 35 to demonstrate the embodiments of the invention. The components of the square manifold are made of rigid plastic, such as PVC, consisting of straight tubing 30, elbow joints 38 and t-joints 32 to connect each manifold to the inflow and outflow tubing. On the insides of the sprayer manifold are a series of misting sprayer heads 34 inserted into the rigid tubing 30 that deliver a misting spray in the direction of the root basket. The system may either be on interval spraying or constant spray depending on the variety of plant, family of plant and genetic makeup of the specific plant. A "mist" will have Sauter mean droplet sizes of between 30 and 60 microns. Anything above 60 microns is considered a "spray." A hydraulic nozzle will produce finer and finer droplets as liquid pressure is raised. A nozzle that produces a mist at a lower pressure may produce a fog at a higher pressure. Thus, the term fog nozzle and misting nozzle are generally interchangeable as the same nozzle may well be able to produce both a mist or a fog depending on the operating pressure. The system can be set up to produce either fogging or misting using either high or low pressure depending on the variety of plant, family of plant and genetic makeup of the specific plant so that the spray delivers the perfect amount of oxygen to the root zone in order to better facilitate the respiration of plant cells. This is done because plants only perform photosynthesis in the green parts of the plant, like leaves and stems, however, all plant cells need oxygen to respire. Cells in the leaves get oxygen from photosynthesis, but cells in the roots need to get oxygen from their immediate environment to survive.

Figure 6:
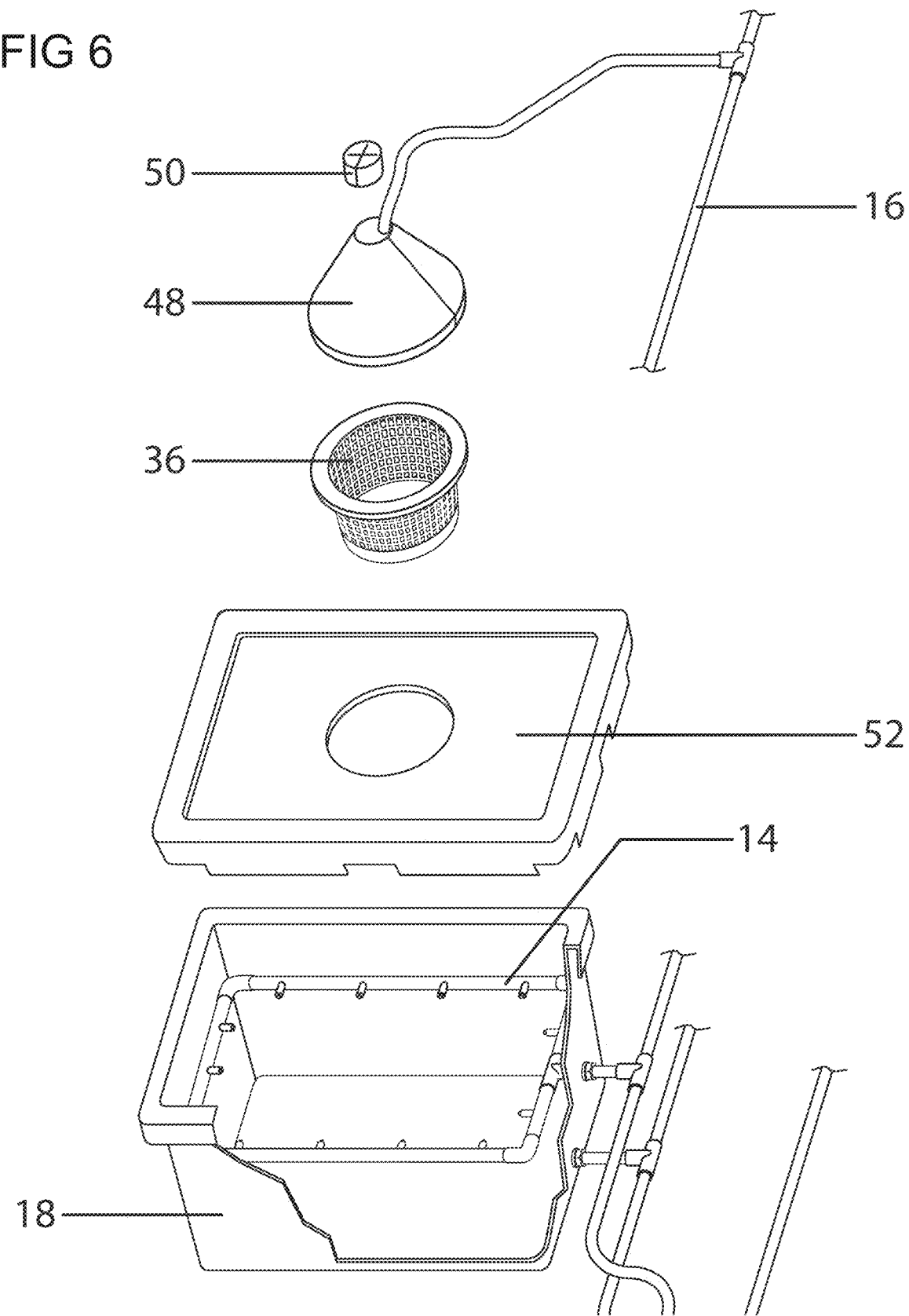
FIG. 6. This figure shows a cross-section diagram of a plant container and the root sprayer manifold, in accordance with some embodiments.

FIG. 6 shows a complete blowout of the plant container 18 set up. This includes the drip manifold 16, lightproof cover 48, plant container lid 52, tubing 14, and the lotic flow return tubes at the bottom of the plant container 18. The spray misting system consists of flexible tubes, PVC or semi rigid tube entering the plant container at a height above the water level in the plant container, at a level that will provide a misting spray on the basket which houses the root ball of the plant. This misting spray will promote the growth of the roots out of all sides of the plant basket and drastically improve the respiration in the root zone and accordingly the nutritional uptake rate of the given specimen. Furthermore, the root zone is home to many microorganisms that require oxygen to respire, thus increasing oxygen to the root zone in proportion to the maximal respiration rate of each specific plant will maximize growth, vigor and yield potential. Typically, a drip irrigation-only or a bottom-container feeding water-nutrient system will mostly promote only root growth out of the base of the root basket which takes the form of a tap root, which will then form a root mass in proportion to the amount of water in the bottom of the container. The mist allows roots to exist at all points within the encasement of each plant container. Roots may occupy any unoccupied space, as long as there is water and oxygen for the roots to live. Traditional methods of farming do not deliver air and water at adequate rates and inhibit the maximal growth potential of many species of plants. The drip system enables the root ball to grow in the top portion of the root basket. For purposes of maximizing respiration, a root mass dangling over a misted basin would still have a mass of dense substrate which is not as efficiently respiring as the basin of roots below which is being misted, since you cannot effectively mist from the top down, you must settle for a drip as the most effective and economic above ground option for irrigation, yet below the ground level surface where the root system of a plant exists there are more effective, efficient ways to drive respiration, more vigorous root growth and a more rapidly growing plant. Additionally, the attached reservoir 10 allows the water flow rate to be consistent enough for water pumps using float valves. To adjust the amount of time in between watering, a larger reservoir could be added, to the point where plants completely water themselves. All water is always recycled and encapsulated from evaporation covered under the lid of the plant site therefore the maximal efficiency of water usage is obtained as no water which has been economically achieved will be burdened by evaporation, ensuring a stable nutrient solution over time, concentration rate due to dehumidification is minimized to an undetectable amount. The proper plant nutrition regiment may be added to the plants one time and with a large enough reservoir you could theoretically water any amount of plants throughout their entire life cycle, no watering labor ever needed. A main reservoir 10 of necessary size may be set up to feed the system in perpetuity, supported by the float valve in each system reservoir 10. For example, one 1000 gallon tank containing the adequate plant nutrient solution will feed 12 tomato plants for 4 months, with absolutely no labor.

Figure 7:
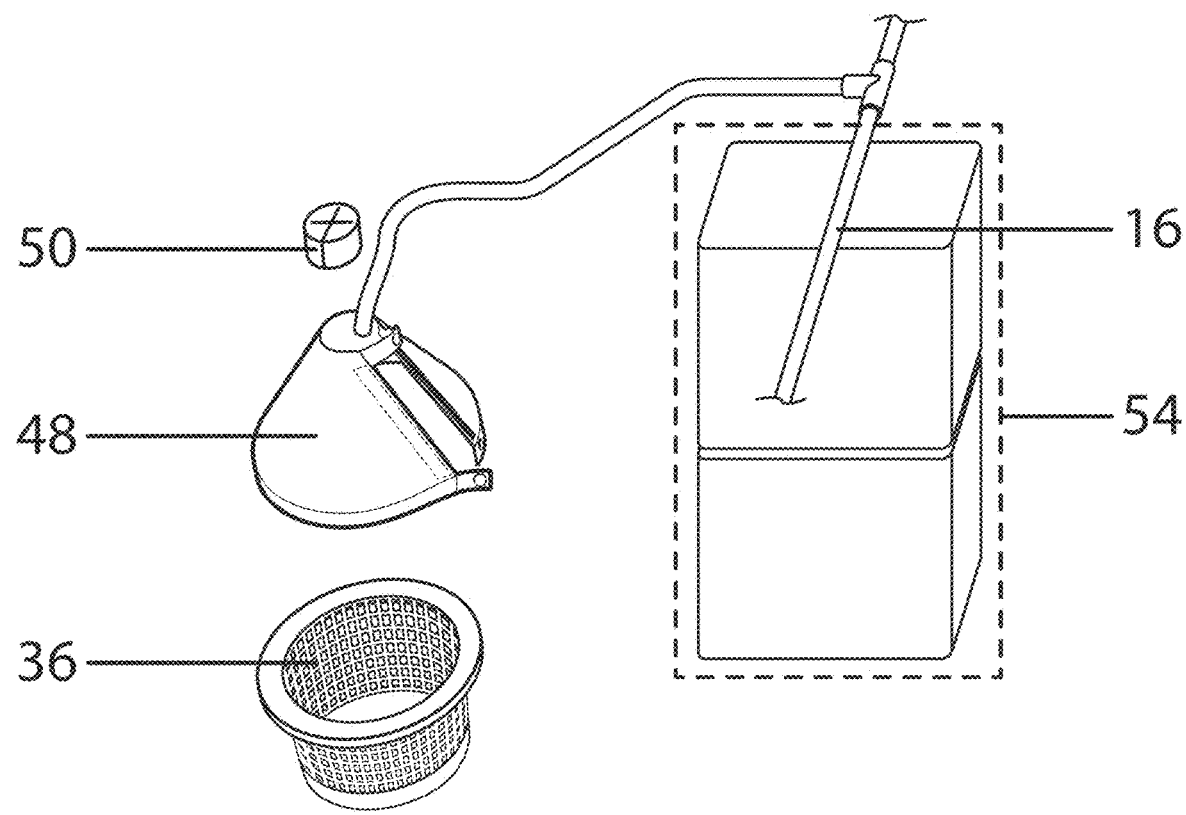
FIG. 7. This figure shows an exploded view of the lightproof cover on the top of the plant baskets, in accordance with some embodiments.

FIG. 7 shows an exploded view of the embodiments of the lightproof cover 48 that goes over each plant container basket. This cover 48 will prevent any light from entering the inside of the basket, deters insects from getting inside the roots and deters algae growth inside the growth medium in each basket. The conical cover 48 is made of a plastic material which wraps around the rim of the root basket via a slit in the plastic cone. After the conical cover 48 is placed around the plant stalk, it has a locking mechanism that keeps the slit closed, such as through button snaps and a Velcro flap. An inner rubber gasket on the inside base of the plastic cone provides a lightproof seal around the root basket 36. There is a hole at the top of the plastic cone cover 48 that is the right size to fit an existing standard foam core plant plug 50, which not only blocks out the light from getting inside, but it also flexible enough to allow the plant's stalk to grow as the plant grows during its life cycle and also allow for pass through of the acequia drip tube. FIG. 7 also shows the ERP 54 that holds the drip manifold 16 in an elevated fashion to deliver the acequia drip to the plant stalk through the foam core plant plug 50.

What is claimed is:

1. A hydroponic plant cultivation system comprising:
   (a) a main reservoir container, the container defining an upper opening and the container having a lid for holding a mixture of water and nutrient solution within said container, a float valve included within said container, a water chilling apparatus that is interconnected with said mixture of water and nutrient solution to maintain a temperature of said mixture of water and nutrient solution between 65 degrees Fahrenheit and 75 degrees Fahrenheit, where the float valve regulates water levels in the main reservoir container when said main reservoir container is connected to an exterior water source that provides water to said main reservoir container;
   (b) a plurality of plant containers, each plant container having a base, a plurality of upper sides adjacent to the base, a lid with an upper opening, a first series of connection tubing, a root basket forming a periphery, the basket periphery having dimensions corresponding to the dimensions of the upper opening, a series of holes along the periphery, wherein the first series of connection tubing connects each adjacent plant container to one another, the first series of connection tubing is interconnected between an exit point from the main reservoir container and at least one plant container;
   (c) an oxygenation system having an air pump, an air manifold attached to the air pump, a second series of connection tubing interconnected with the air manifold and interconnected to the base of at least one said plant container, wherein an aeration stone is connected to the second series of connection tubing within the base of respective said plant containers;
   (d) a drip delivery system having a water pump, a third series of connection tubing, a drip manifold, where the pump is placed in the main reservoir container, the third series of connection tubing is interconnected to the pump from the main reservoir container and the drip manifold, the respective manifold is placed at an elevation point directly above the respective plant container lid.

2. The system of claim 1, further comprising a root spraying system having a series of misting sprayer manifolds in each plant container and a fourth series of connection tubing connecting the misting sprayer manifolds to the main reservoir container, each misting sprayer manifold generally corresponds to the dimensions of the respective plant container, wherein each misting sprayer manifold further includes a number of sprayer heads aligned in equal distance apart, along the length of the misting sprayer manifold.

3. The system of claim 2, wherein each of the root baskets further includes a respective cover with a respective slit extending along the side of the respective cover, the respective cover having slightly larger dimensions than the periphery of the respective root basket such that the respective cover fits over the respective root basket.

4. The system of claim 3, wherein the respective cover of a respective root basket further includes a latching mechanism that allows for the respective cover to be closed around a plant stalk, and the respective cover has a respective hole at the top to allow for a respective foam insert to be placed within the respective hole, where the third series of tubing is inserted though the respective foam insert and form part of the drip delivery system.

5. The system of claim 3, wherein each respective conical cover, respective plant container, and respective plant container lid form a lightproof plant container, such that no light enters the respective plant container.

\* \* \* \* \*

UNITED STATES PATENT AND TRADEMARK OFFICE
CERTIFICATE OF CORRECTION

| | | |
|---|---|---|
| PATENT NO. | : 11,582,926 B2 | Page 1 of 1 |
| APPLICATION NO. | : 16/160848 | |
| DATED | : February 21, 2023 | |
| INVENTOR(S) | : Caleb Mata | |

It is certified that error appears in the above-identified patent and that said Letters Patent is hereby corrected as shown below:

In the Claims

Column 6, Line 16 Claim 1: Delete "an exit point from".

Signed and Sealed this
Twenty-second Day of August, 2023

Katherine Kelly Vidal
*Director of the United States Patent and Trademark Office*